Patented Feb. 17, 1942

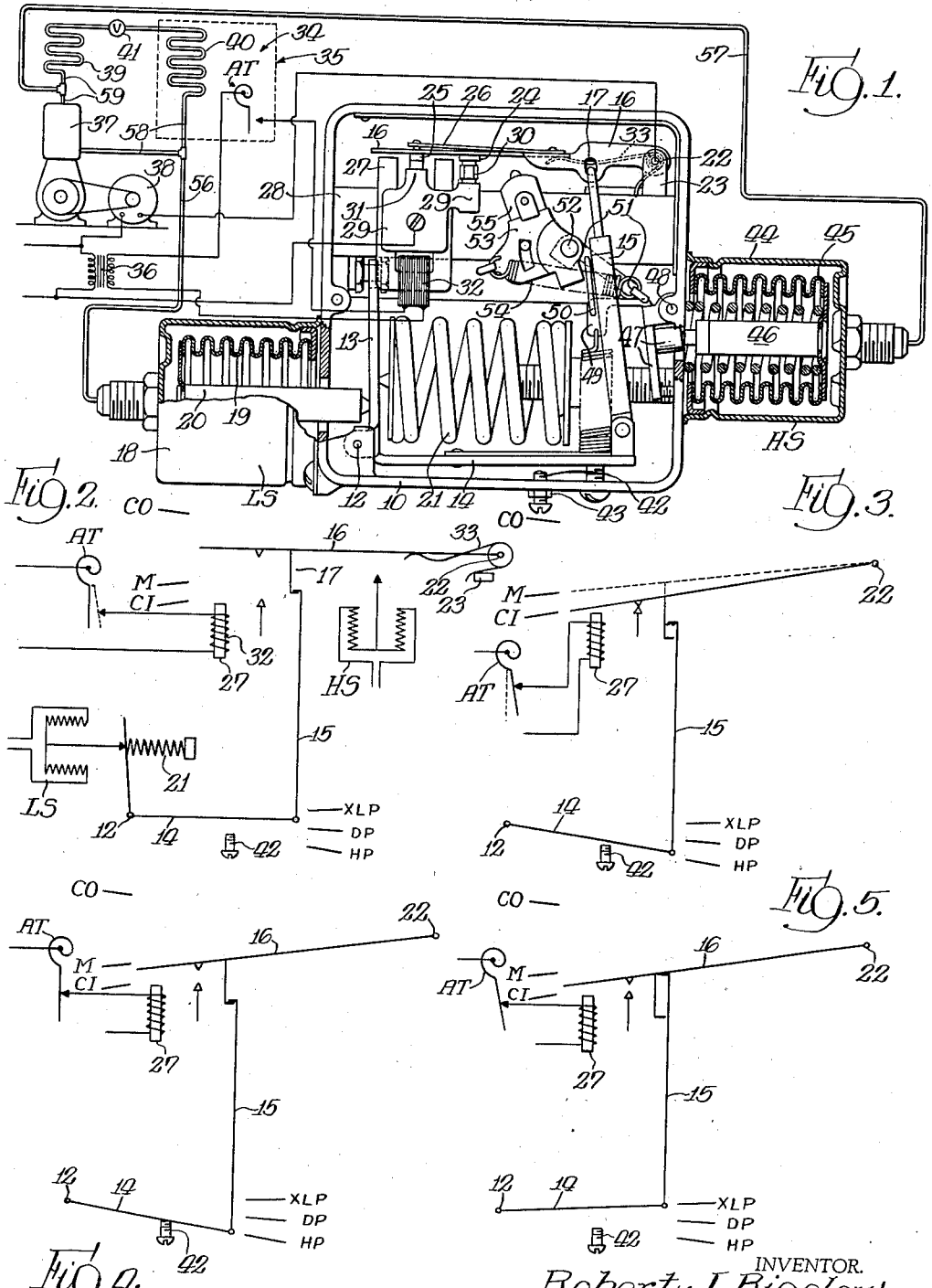

2,273,343

UNITED STATES PATENT OFFICE 2,273,343

REFRIGERATION CONTROL STRUCTURE

Robert J. Bigelow, Rochester, Minn., assignor to Penn Electric Switch Co., Goshen, Ind., a corporation of Iowa Application June 10, 1940, Serial No. 339,747

15 Claims. (Cl. 62—4)

My invention relates to a refrigeration control structure which is responsive to both low side pressure in the refrigerant system and to air temperature within the space being refrigerated.

One object of the invention is to provide a simple, durable and inexpensive arrangement of control switch or the like wherein the control switch for a refrigerant compressor motor may be located adjacent the refrigeration machinery and connected with the low side and the high side of the system and a thermostat responsive to the temperature of the air in the space being refrigerated may operate in conjunction with the low side and high side pressure responsive devices to control the switch as desired, with low tension wires serving as an operative connection between the air thermostat and the control switch.

Another object is to provide a switch of the usual character responsive in a somewhat modified manner to the low side pressure in a refrigeration system and having applied thereto an air temperature responsive device in the form of an electromagnet or the like which modifies the action of the control switch to secure certain desired advantages.

More particularly, it is my object to provide a low side pressure responsive control switch with a means to prevent cut-in of the switch by the low side pressure responsive device even in its high pressure position, and to provide in conjunction with the control switch an electro-responsive device under control of an air thermostat in the space being refrigerated and responsive to move the control switch to cut-in position any time that the low side pressure responsive device has moved it into a certain range of switch movement, the low side pressure responsive device, however, being capable in response to an extreme low pressure of moving the control switch to cut-out position even when the air temperature responsive device is in its cut-in position.

With these and other objects in view, my invention consists in the construction, arrangement and combination of the various parts of my device whereby the objects contemplated are attained, as hereinafter more fully set forth, pointed out in my claims and illustrated in the accompanying drawing. Although the invention is susceptible of a variety of embodiments, it is unnecessary to fully described and illustrate more than one in order to give a full understanding of the invention both from its structural and functional standpoints. Accordingly, I have illustrated a preferred and desirable embodiment of the invention in the accompanying drawing, in which:

Figure 1 is a front elevation of a refrigerant control structure embodying my invention and showing it hooked up diagrammatically with a refrigerant system, and suitable wiring therefor being also shown diagrammatically;

Figure 2 is a diagrammatic view of the essential elements of Figure 1 in a normal cut-out position;

Figure 3 is a similar view showing a normal cut-in position;

Figure 4 is a similar view showing the low side pressure responsive device at its high pressure limit of movement and the air thermostat open, and Figure 5 is a similar view showing the air thermostat closed and the low side pressure responsive device at its extreme low pressure position.

On the accompanying drawing, I have used the reference numeral 10 to indicate generally a switch housing. The cover for the switch housing has been omitted in order to show the structure within the housing.

A low side pressure responsive device, indicated generally at LS, is provided and a somewhat similar high side pressure responsive device indicated generally at HS is also provided, both for operating the switch mechanism within the housing 10.

Pivoted on a pin 12 within the housing 10 is a bell crank having an arm 13 and an arm 14. The arm 14 is operatively connected by means of a link 15 with a switch arm 16. The connection includes a slot 17, so that the connection between the link 15 and the arm 16 is one of lost motion type.

The low side pressure responsive device LS comprises a bellows housing 18 within which a bellows 19 is mounted. An actuating pin 20 extends from the head of the bellows to the arm 13 with which it contacts. A range adjusting spring 21 retains the pin and arm in contact with each other and opposes collapse of the bellows 19.

The switch arm 16 is pivoted at 22 to a bracket 23 and carries a main contact 24 and an auxiliary contact 25. The contact 25 is mounted on a leaf spring 26 in such manner that the contact can move through an opening in the switch arm 16, although it is constrained by the spring 26 to a position with the spring in contact with the upper surface of the arm.

A horseshoe magnetic core 27 is mounted on a bar 28 of insulating material by a bracket 29. The bracket 29 carries a main stationary contact 30 and an auxiliary stationary contact 31 for cooperation with the contacts 24 and 25, respectively.

A coil 32 is wound on the core 27 whereby the coil and core form an electromagnet which tends to attract the switch arm 16 (the arm being formed of ferrous or other magnetic material). Opposing any tendency of the magnetic core 27 to move the switch arm 16 to cut-in position is a spring 33 wound around the pivot pin 22 and having its opposite ends contacting with the switch arm 16 and the bracket 23. The strength of the spring 33 in relation to the pull of the magnetic core 27 when its coil 32 is energized is such that the magnet can overcome the spring any time the switch arm is between an intermediate position and cut-in position (for instance, the positions M and CI in Figure 2), and the spring will overcome the pull of the energized electromagnet when the switch arm is between M and CO (cut-out) positions.

The coil 32 is under control of an air thermostat AT mounted in the space to be refrigerated, which is indicated at 34 within the refrigerator box 35 in Figure 1. The current for the thermostat AT and the coil 32 may be supplied as from a transformer 36.

The refrigeration system shown diagrammatically in Figure 1 further includes a refrigerant compressor 37, an electric motor 38 therefor, a condenser coil 39, an evaporator coil 40 and an expansion valve 41. The motor 38 is under control of the switch contacts 24, 25, 30 and 31, the circuit therefor being shown in Figure 1 as connected with the bracket 29 and the pivot pin 22.

A stop screw 42 is provided for the arm 14 of the low side pressure responsive bell crank, the importance of which will hereinafter appear. The screw 42 may be adjustable, as by threading it through the lower wall of the casing 10 and any adjustment may be retained by a lock nut 43.

The high side responsive member HS of my switch structure embodies the usual bellows casing 44 enclosing a bellows 45, which bellows operates a toggle mechanism consisting of the following parts: An actuating pin 46 extends from the head of the bellows 45 and controls an arm 47 pivoted at 48. The arm 47 has an extension 49 connected by a link 50 with a second arm 51. The arm 51 is pivoted at 52 and also on the pivot 52 is a third arm 53. The arms 51 and 53 are toggle arms connected together by an overcenter spring 54, and the arm 53 includes an insulated member 55 which is adapted when the pressure within the bellows housing 44 gets excessively high to be quickly moved by the overcenter spring 54, as a result of the toggle lever 51 swinging counterclockwise to a position where the spring 54 passes the pivot center 52. The high side bellows 45 is a safety bellows, operating only when there is an excessively high pressure and at that time throwing the switch arm 16 to its cut-out position, regardless of any call for a cut-in position by either the low side pressure responsive device LS or the electromagnet 27.

The low side bellows 19 and the high side bellows 45 are connected as by conduits 56 and 57 to the low side conduit 58 and the high side conduit 59 of the refrigeration system.

*Practical operation*

In the operation of my refrigeration control structure, assuming that the parts are in the position shown in Figure 2, a normal cut-out position is illustrated. The cut-out, intermediate and cut-in positions of the switch arm 16, indicated respectively at CO, M and CI, have already been referred to. The low side pressure responsive device has three distinct positions indicated at XLP, DP and HP. The position XLP is an extreme low pressure position. The position DP is the one at which, if the switch arm 16 were under control of the low side pressure responsive device LS only, would effect cut-in of the switch after defrosting had been insured. The high pressure position HP is the one assumed against the stop 42 and wherein, if the low side pressure responsive device alone controlled the switch 16, the switch would still not be in its cut-in position. This position is illustrated in Figure 4.

The normal cut-out position of Figure 2 indicates that the low side pressure responsive device LS is between the defrosting position DP and the extreme low pressure position XLP. The air thermostat AT is open (full line position). Accordingly, the switch arm 16 is intermediate positions CO and M.

If now the thermostat AT closes, as shown by dotted lines, nothing happens because the electromagnet 27—32 does not develop sufficient magnetic attraction to overcome the tension of the spring 33 when the arm 16 is above position M. It is therefore evident that the thermostat AT alone cannot effect cut-in of the switch and, in fact, such cut-in is delayed until after the low side pressure responsive device moves the switch arm 16 to the dotted position of Figure 3. To do this, the low-side pressure responsive device must move past the defrosting pressure position DP (that is, go to a higher pressure or a position intermediate DP and high pressure position HP). Since the thermostat AT is closed in Figure 3, as soon as the dotted position of the switch arm 16 occurs, the electromagnet 27—32 moves the switch arm to cut-in position, as shown by full lines.

In case the air temperature is sufficiently low and the thermostat AT therefore open, as illustrated by dotted lines, but the low-side pressure has raised the arm 14 to the illustrated position between DP and HP in Figure 3, the switch arm 16 will not move to cut-in position even though the low side pressure goes to its high pressure position of Figure 4. The length of the slot 17 and the relative travel of the switch arm 16 and the bell crank arm 14 are such that the position of Figure 4 will be assumed when the stop 42 is properly set. The thermostat AT is in open position and it is only by the closing of this thermostat that cut-in of the switch can be effected after the parts have assumed the position shown in Figure 4. It is evident therefore that the low-side pressure responsive device cannot alone cause cut-in of the switch.

When the low-side pressure recedes at a time when the thermostat AT is still closed, recession of the arm 14 to a position in Figure 5 between DP and XLP can occur without moving the switch arm 16 from its cut-in position. However, when the arm 14 recedes to its extreme low pressure position XLP, then it positively moves the switch arm to the cut-out position illustrated even though the electromagnet 27—32 is still energized.

From the foregoing construction and description of the operation of my control structure, it will be obvious that a number of advantageous results are obtained from the interconnection of a low side pressure responsive device, a high side pressure responsive device and an air temperature responsive device. When the air thermostat is at cut-in position, the switch cuts in only after the low side pressure responsive device has responded to a pressure higher than that insuring defrosting of the evaporator. The low side pressure responsive device can go to its high pressure position, however, without cutting in the switch, if the air thermostat is open. The air thermostat can be in cut-in position but the low side pressure responsive device, if it responds to an extreme low pressure condition, will effect cut-out of the switch in spite of the air thermostat.

These results flow from having a switch arm which, when on one side of an intermediate position, can be attracted by the electromagnet against the action of the spring and when on the other side of such intermediate position the spring overcomes the attracting tendency of the magnet. The lost motion connection between the low side pressure responsive device and the switch arm is so designed that the low side bellows moves the switch arm to a desired position so that it can thereafter be controlled by the electromagnet or moves it to a cut-out position even though the air temperature device is in closed position, if an extreme low pressure condition happens to occur in the low side of the refrigeration system. Accordingly, the low side pressure device can cut the switch out when any desired back pressure is reached, regardless of air temperature, but would move the switch to cut-out position in response to the low side bellows only when there is an extra heavy load applied to the evaporator coil.

The low side bellows cannot move the switch to cut-in position at any time, due to the stop 42, as it takes energization of the coil 32 to move the switch arm through its final movement to cut-in position from the position of Figure 4 after the low side bellows has assumed its high pressure position. The air thermostat can effect cut-in of the switch any time after, but not before, the low side bellows has moved the switch past a defrosting pressure position. The final result is a desired control of the temperature within the box 35 as a result of both low side pressure and air temperature, to take care of any contingency, such as leaving the door of the box open for prolonged periods of time. All of these advantages are obtained in a control structure which insures defrosting at every cycle of operation regardless of the thermostat AT calling for operation at times when there might be frost on the coil.

My arrangement also provides for an installation wherein minimum lengths of conduit 56 and 57 may be used for piping the controller to the low and high sides of a refrigerant system, with the controller mounted adjacent the compressor. At the same time the air thermostat AT may be remotely located because of the position of the icebox at street level and the refrigerant system in the basement for instance, with only the necessity of running low tension wires from the refrigerant controller up to the thermostat in the box. By means of a controller of the character disclosed, responding to both low side pressure and air temperature in the manner disclosed, the control is particularly adapted for butcher and florist boxes where it is essential to maintain the proper temperature all the time, regardless of whether the box is opened many times during the day or left continuously closed during the night.

Certain changes may be made in the construction and arrangement of the parts of my refrigeration controller without departing from the real spirit and purpose of my invention. It is therefore my intention to cover by my claims such modified forms of structure or use of mechanical equivalents as may be reasonably included within their scope without sacrificing any of the advantages thereof.

What I claim as my invention and desire to secure by Letters Patent of the United States is:

1. In a refrigeration control structure, a switch arm having cut-in and cut-out positions, an electromagnet tending to move said switch arm to cut-in position, a spring tending to move said switch arm to cut-out position, said electromagnet being capable of moving said switch arm to cut-in position against the action of said spring upon the switch arm being moved from cut-out position to a predetermined intermediate position, said spring being capable of moving said switch arm to cut-out position against the action of said electromagnet upon said switch arm being moved from cut-in position to said predetermined intermediate position, switch contacts controlled by said switch arm and connected in circuit with a refrigerant compressor motor, means responsive to low side pressure of the refrigerant system and operable to move said switch arm to said predetermined position upon rise of the low side pressure past a degree which permits defrosting of the evaporator coil of the refrigerant system before said predetermined intermediate position of said switch arm is reached, an air thermostat responsive to the temperature of air in the space being refrigerated and controlling said electromagnet, a stop for said low side pressure responsive means in a position incapable of moving said switch arm to cut-in position and said low pressure responsive means being movable in response to extreme low pressure to a position effecting opening of said switch arm while said electromagnet is energized.

2. In a refrigeration control structure, a switch arm having cut-in and cut-out positions, an electromagnet tending to move said switch arm to cut-in position, a spring tending to move said switch arm to cut-out position, said electromagnet being capable of moving said switch arm to cut-in position against the action of said spring upon the switch arm being moved from cut-out position to a predetermined intermediate position, said spring being capable of moving said switch arm to cut-out position against the action of said electromagnet upon said switch arm being moved from cut-in position to said predetermined intermediate position, switch contacts controlled by said switch arm and connected in circuit with a refrigerant compressor motor, means responsive to low side pressure of the refrigerant system and operable to move said switch arm to said predetermined position upon rise of the low side pressure past a degree which permits defrosting of the evaporator coil of the refrigerant system before said predetermined intermediate position of said switch arm is reached, an air thermostat responsive to the temperature of air in the space being refrigerated and controlling said electromagnet, a stop for said low side pressure responsive means in a position incapable of moving said switch arm to cut-in position, said low pressure responsive means being movable in response to extreme low pressure to a position effecting opening of said switch arm while said electromagnet is energized, and means responsive to the pressure in said refrigerant system and operable to move said switch arm to cut-out position at any time.

3. In a refrigeration control structure, a switch arm having cut-in and cut-out positions, electromagnetic means tending upon energization to move said switch arm to cut-in position, a spring tending to move said switch arm to cut-out position, said electro-magnetic means being capable of moving said switch arm to cut-in position against the action of said spring upon the switch arm being moved to one side of a predetermined intermediate position, said spring being capable of moving said switch arm to cut-out position against the action of said electro-magnetic means upon said switch arm being moved to the other side of said predetermined intermediate position, switch contacts controlled by said switch arm and in circuit with a refrigerant compressor motor, means responsive to low side pressure of the refrigerant system and operable to move said switch arm to said other side of said predetermined position upon rise of the low side pressure from a low degree past a degree which permits defrosting of the evaporator coil of the refrigerant system before said predetermined intermediate position of said switch arm is reached, an air thermostat responsive to the temperature of air in the space being refrigerated and controlling said electro-magnetic means, said low pressure responsive means being movable in response to extreme low pressure to a position effecting opening of said switch arm while said electro-magnetic means is energized.

4. In a refrigeration control structure, a switch arm having cut-in and cut-out positions, electromagnetic means tending upon energization to move said switch arm to cut-in position, a spring tending to move said switch arm to cut-out position, said electro-magnetic means being capable of moving said switch arm to cut-in position against the action of said spring upon the switch arm being moved to one side of a predetermined intermediate position, said spring being capable of moving said switch arm to cut-out position against the action of said electro-magnetic means upon said switch arm being moved to the other side of said predetermined intermediate position, switch contacts controlled by said switch arm and in circuit with a refrigerant compressor motor, means responsive to low side pressure of the refrigerant system and operable to move said switch arm to said other side of said predetermined position upon rise of the low side pressure from a low degree past a degree which permits defrosting of the evaporator coil of the refrigerant system before said predetermined intermediate position of said switch arm is reached, an air thermostat responsive to the temperature of air in the space being refrigerated and controlling said electro-magnetic means, and a stop for said low side pressure responsive means in a position preventing said switch arm from being moved to cut-in position.

5. In a refrigeration control structure, a switch arm, an electromagnet tending to move said switch arm to cut-in position, a spring tending to move said switch arm to cut-out position, said electromagnet being capable of moving said switch arm to cut-in position against the action of said spring and said spring being capable of moving said switch arm to cut-out position against the action of said electromagnet upon said switch arm being moved to one side or the other of a predetermined intermediate position between cut-in and cut-out positions, a switch in circuit with a refrigerant compressor motor and controlled by said switch arm, means responsive to low side pressure of the refrigerant system and operable to move said switch arm to said predetermined position upon rise of the low side pressure from a low degree past a degree which permits defrosting of the evaporator coil of the refrigerant system before said predetermined intermediate position of said switch arm is reached, and an air thermostat responsive to the temperature of air in the space being refrigerated and controlling said electromagnet.

6. In a refrigeration control structure, a switch arm, an electromagnet tending to move said switch arm to cut-in position, a spring tending to move said switch arm to cut-out position, said electromagnet being capable of moving said switch arm to cut-in position against the action of said spring and said spring being capable of moving said switch arm to cut-out position against the action of said electromagnet upon said switch arm being moved to one side or the other of a predetermined intermediate position between cut-in and cut-out positions, a switch in circuit with a refrigerant compressor motor and controlled by said switch arm, means responsive to low side pressure of the refrigerant system and operable to move said switch arm to said predetermined position upon rise of the low side pressure from a low degree past a degree which permits defrosting of the evaporator coil of the refrigerant system before said predetermined intermediate position of said switch arm is reached, an air thermostat responsive to the temperature of air in the space being refrigerated and controlling said electromagnet, and a high side responsive device operable in predominance over said electro-magnet, said spring and said low side responsive device to move said switch arm to cut-out position.

7. In a refrigerant system controller, a switch in circuit with a refrigerant compressor motor and having spaced cut-in and cut-out positions and an intermediate position, a plurality of devices responsive respectively to air temperature in the space being refrigerated and to low side pressure, said devices being operable in conjunction with each other to move said switch arm to cut-in and cut-out positions with cut-in of the switch occurring only when the air temperature responsive device and the low side pressure responsive device are in cut-in position and in a pressure position above that permitting defrosting of the evaporator coil respectively, said low side pressure responsive device in its high pressure position tending to move said switch to cut-in position, said air temperature responsive device in its cut-out position preventing such movement, said low side pressure responsive device being capable of moving said switch to its cut-out position when it reaches an extreme low pressure position and said air temperature responsive device is still in cut-in position, said air temperature responsive device being capable of effecting movement of said switch to cut-out position at any time regardless of the position of the low side pressure responsive device.

8. In a refrigerant system controller, a switch in circuit with a refrigerant compressor motor, a plurality of devices responsive respectively to air temperature in the space being refrigerated, to low side refrigerant pressure and to high side refrigerant pressure, said first two devices being operable in conjunction with each other to move said switch arm to cut-in and cut-out positions with cut-in of the switch occurring only when the air temperature responsive device is in cut-in position and the low side pressure responsive device is in a pressure position above that permitting defrosting of the evaporator coil, said low side pressure responsive device in its high pressure position tending to move said switch to cut-in position, said air temperature responsive device in its cut-out position preventing such movement, said air temperature responsive device being capable of effecting movement of said switch to cut-out position at any time regardless of the position of the low side pressure responsive device, and said high side refrigerant pressure responsive device being capable of effecting movement of said switch arm to cut-out position at any time regardless of the positions of said low side refrigerant pressure responsive and air temperature responsive devices.

9. In a refrigerant system controller, a switch in circuit with a refrigerant compressor motor, a plurality of devices responsive respectively to air temperature in the space being refrigerated, to low side refrigerant pressure and to high side refrigerant pressure, said first two devices being operable in conjunction with each other to move said switch arm to cut-in and cut-out positions with cut-in of the switch occurring only when the air temperature responsive device is in cut-in position and the low side pressure responsive device is in a pressure position above that permitting defrosting of the evaporator coil, said low side pressure responsive device in its high pressure position tending to move said switch to cut-in position, said air temperature responsive device in its cut-out position preventing such movement, said low side pressure responsive device being capable of moving said switch to its cut-out position when it reaches an extreme low pressure position.

10. In a refrigerant system controller, a switch in circuit with a refrigerant compressor motor, an actuating element for said switch, a low side pressure responsive device and an air temperature responsive device for controlling said actuating element, said low side pressure responsive device effecting movement of said actuating element throughout a range from cut-out position to a position between an intermediate position and cut-in position when the low side pressure responsive device moves between an extreme low pressure position and a high pressure position passing a position intermediate the two where defrosting of the evaporator coil is insured, said air temperature responsive device comprising a thermostat and electro-magnetic means operated thereby and effective to move said actuating element to cut-in position providing it is anywhere between said intermediate position and cut-in position but permitting the actuating element to retain said switch open when the element is in any position between said intermediate position and cut-out position.

11. In a refrigerant system controller, a switch in circuit with a refrigerant compressor motor, an actuating element for said switch having substantially spaced cut-in and cut-out and intermediate positions, a low side pressure responsive device and an air temperature responsive device for controlling said actuating element, said low side pressure responsive device effecting movement of said actuating element throughout a range from cut-out position to a position between said intermediate position and cut-in position when the low side pressure responsive device responds to a low side pressure higher than one in which defrosting of the evaporator coil is insured, said air temperature responsive device being effective to move said actuating element to cut-in position providing it is anywhere between said intermediate position and cut-in position but permitting said element to retain said switch open when the element is in any position between said intermediate position and cut-out position.

12. In a refrigerant system controller, a switch in circuit with a refrigerant compressor motor, an actuating element for said switch, a low side pressure responsive device and an air temperature responsive device for controlling said actuating element, said low side pressure responsive device effecting movement of said actuating element throughout a range from cut-out position to a position adjacent cut-in position when the low side pressure responsive device moves between an extreme low pressure position and a high pressure position higher than that where defrosting of the evaporator coil is insured, said air temperature responsive device being effective to move said actuating element to cut-in position providing it is anywhere between said intermediate position and cut-in position but permitting the actuating element to retain said switch in open position when the element is in any position between said intermediate position and cut-out position, and a high side refrigerant pressure responsive device operable independent of said air temperature and low side pressure responsive devices.

13. A switch structure for a refrigerant system comprising a switch arm having cut-in, cut-out and intermediate positions, a spring tending to move said switch arm to cut-out position, an electromagnet tending to move said switch arm to cut-in position, an air temperature responsive thermostat controlling said electromagnet and a low side pressure responsive means having a lost motion connection with said switch arm, said electromagnet being capable of moving said switch arm to cut-in position any time it assumes a position between said intermediate position and said cut-in position and only tending to do so any time the switch arm assumes a position between said intermediate position and cut-out position, said low side pressure responsive device, through said lost motion connection, being capable of moving said switch arm to said intermediate position from either cut-in or cut-out position and the low side pressure responsive device being movable through a range of movement between an extreme low pressure position and a high pressure position, said low pressure responsive means passing through a defrosting pressure position intermediate said extreme low pressure position and said high pressure position, at the extreme low pressure position being capable of moving said switch arm to cut-out position independent of said electromagnet and at said high pressure position tending to move said switch arm to cut-in position and doing so only with the help of said electromagnet.

14. A switch structure for a refrigerant system comprising a switch arm, a spring tending to move said switch arm to cut-out position, an electromagnet tending to move said switch arm to cut-in position, an air temperature responsive thermostat controlling said electromagnet and a low side pressure responsive means having a lost motion connection with said switch arm, said electromagnet being capable of moving said switch arm to cut-in position any time it assumes a position between a predetermined intermediate position and said cut-in position and only tending to do so any time the switch arm assumes a position between said intermediate position and cut-out position, said low side pressure responsive device being capable of moving said switch arm to said intermediate position from either cut-in or cut-out position and the low side pressure responsive device being movable through a range of movement between a low pressure position and a high pressure position, said low pressure responsive means passing through a defrosting pressure position between said low pressure position and said high pressure position and at said high pressure position tending to move said switch arm to cut-in position and doing so only with the help of said electromagnet.

15. A switch structure for a refrigerant system comprising a switch arm, a spring tending to move said switch arm to cut-out position, an electromagnet tending to move said switch arm to cut-in position, an air temperature responsive thermostat controlling said electromagnet and a low side pressure responsive means having a lost motion connection with said switch arm, said electromagnet being capable of moving said switch arm to cut-in position any time it assumes a position between a predetermined intermediate position and said cut-in position and only tending to do so any time the switch arm assumes a position between said intermediate position and cut-out position, said low side pressure responsive device being capable of moving said switch arm to said intermediate position from either cut-in or cut-out position and the low side pressure responsive device being movable through a range of movement between a low pressure position and a high pressure position, said low pressure responsive means passing through a defrosting pressure position between said low pressure position and said high pressure position and at the extreme low pressure position being capable of moving said switch arm to cut-out position independent of said electromagnet.

ROBERT J. BIGELOW.